US012191741B2

(12) United States Patent
Kuo (10) Patent No.: US 12,191,741 B2
(45) Date of Patent: Jan. 7, 2025

(54) MOTOR ASSEMBLY

(71) Applicant: MOBILETRON ELECTRONICS CO., LTD., Taichung (TW)

(72) Inventor: Tung-Chin Kuo, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 219 days.

(21) Appl. No.: 18/071,505

(22) Filed: Nov. 29, 2022

(65) Prior Publication Data

US 2023/0170760 A1 Jun. 1, 2023

(30) Foreign Application Priority Data

Dec. 1, 2021 (TW) .................................. 110144744

(51) Int. Cl.
| | |
|---|---|
| *H02K 5/15* | (2006.01) |
| *H02K 5/173* | (2006.01) |
| *H02K 7/00* | (2006.01) |
| *H02K 7/08* | (2006.01) |

(52) U.S. Cl.
CPC ............ *H02K 5/15* (2013.01); *H02K 5/1732* (2013.01); *H02K 7/003* (2013.01); *H02K 7/083* (2013.01)

(58) Field of Classification Search
CPC ........ H02K 5/15; H02K 5/1732; H02K 7/003; H02K 7/083; H02K 5/1672; H02K 5/24; H02K 21/16
See application file for complete search history.

(56) References Cited

U.S. PATENT DOCUMENTS

| | | | | |
|---|---|---|---|---|
| 2014/0373795 | A1* | 12/2014 | Yamanaka | F01L 1/344 123/90.11 |
| 2017/0353085 | A1 | 12/2017 | Kitamura et al. | |

FOREIGN PATENT DOCUMENTS

| | | |
|---|---|---|
| TW | 252649 | 7/1995 |
| TW | 201931732 A | 8/2019 |
| WO | 2018051773 A1 | 3/2018 |

OTHER PUBLICATIONS

Search Report for TW110144744, Issued on Jul. 7, 2022, Total of 1 page.

* cited by examiner

*Primary Examiner* — Thomas Truong
(74) *Attorney, Agent, or Firm* — Apex Juris, pllc; Hilde Coeckx (57) ABSTRACT

A motor assembly includes a motor in a housing. The motor includes a stator and a rotor mounted in the stator casing, and an output shaft engaged with the rotor passes through the stator casing. Two opposite ends of the stator casing and the stator abuts against an annular plate and a rear end cap, respectively. Each screw passes through the rear end cap and the stator to screw into the annular plate, so the stator is fixed and restricted from moving axially in the stator casing. A front end of the housing is engaged with a motor fixing frame. The output shaft passes through a bearing on the motor fixing frame. The motor fixing frame is spaced from the motor. With such design, a vibration of the output shaft during operation is transmitted to the housing, but not directly affect the screws in the motor, thereby increasing the durability of the motor assembly.

17 Claims, 10 Drawing Sheets

MOTOR ASSEMBLY

BACKGROUND OF THE INVENTION

Technical Field

The present invention relates generally to a motor structure, and more particularly to a motor assembly that is antishock and easy to assemble.

Description of Related Art

A conventional motor assembly includes a housing, wherein a stator casing is engaged with the housing. Screws pass through the front end cap, the stator, and the rear end cap to fix the stator in the stator casing. The stator can generate a magnetic field to drive the rotors in the housing to rotate, thereby driving the output shaft to rotate.

The front end cap, the stator, and the rear end cap are connected by screwing to fix the stator of the conventional motor assembly. However, when the motor assembly is mounted in the impact device, the reaction force is exerted on the output shaft to vibrate during work. The vibration transmits to the front end cap via the output shaft, so that the screws between the front end cap and the stator have to bear the shearing force. Thus, the conventional motor assembly could be easily damaged, and the life of the conventional motor assembly is reduced.

BRIEF SUMMARY OF THE INVENTION

In view of the above, the primary objective of the present invention is to provide a motor assembly, wherein the motor and the motor fixing frame are separately connected to the housing to avoid fasteners, such as screws, being damaged by the vibration caused by the reaction force. Additionally, the assembly structure of the motor could be simplified as well, which facilitates assembly, disassembly, and maintenance.

The present invention provides a motor assembly, including a housing, a motor, and a motor fixing frame. The motor includes a stator casing, a stator, an output shaft, a rotor, an annular plate, and a rear end cap. The stator casing is fixed in the housing and is restricted from rotating along an output shaft, the stator is embedded into the stator casing. A circumference of the stator has a plurality of through holes. The output shaft passes through a middle of the stator casing. The rotor is engaged with a portion of the output shaft that is surrounded by the stator. The annular plate abuts against an end surface of the stator casing and an end surface of the stator, and the annular plate has a plurality of screw holes. The rear end cap has a plurality of perforations and abuts against another end surface of the stator casing and another end surface of the stator. Each of the perforations on the rear end cap is inserted by a screw, and each of the screws passes through one of the through holes and is screwed into corresponding one of the screw holes on the annular plate. The rear end cap is disposed with a rear bearing, and the output shaft passes through the rear bearing. The motor fixing frame is engaged with the end surface of the housing and has a front bearing, wherein the output shaft passes through the front bearing, and the motor fixing frame is spaced from the motor.

With the aforementioned design, the motor fixing frame is spaced away from the motor. When the output shaft is affected by the reaction force to vibrate, the vibration of the output shaft is transmitted to and absorbed by the housing, and the screws in the motor do not bear the shearing force, thereby ensuring the motor be used for a long time and not to be damaged easily. Additionally, during the assembly of the motor, the annular plate should abut against the end surface of the stator first, and the screws connect the stator, the rear end cap, and the annular plate. The design facilitates assembly, disassembly, and maintenance.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As illustrated in FIG. 1 to FIG. 8, a motor assembly 100 of an embodiment according to the present invention includes a housing 10, a motor 20, and a motor fixing frame 30.

The housing 10 has a mounting space 12 inside, and a front end of the housing 10 that faces the motor fixing frame 30 has an end surface 14. In the current embodiment, the housing 10 is made of plastic and includes a first shell 16 and a second shell 18, wherein the first shell 16 is engaged with the second shell 18 to form the housing 10. In other embodiments, the housing 10 could be made of other materials, such as a composite material. Besides, the housing 10 could be integrally formed as a monolithic unit.

The motor 20 is mounted in the mounting space 12 of the housing 10. The motor 20 includes a stator casing 21, a stator 22, an output shaft 23, a rotor 24, an annular plate 25, and a rear end cap 26. The stator casing 21 is a cylindrical case. The stator casing 21 is fixed in the housing 10 and is restricted from rotating along an axis of the output shaft 23. An inner circumference of the stator casing 21 has a plurality of recesses 211, which is spaced.

The stator 22 is embedded into the stator casing 21, and an axis of the stator 22 is aligned with an axis of the stator casing 21. An outer circumference of the stator 22 has a plurality of protruding portions 221 which is spaced and corresponds to the recesses 211 of the stator casing 21. During a process of inserting the stator 22 into the stator casing 21, the stator 22 is inserted into the stator casing 21 in a direction along the axis of the stator casing 21, and the protruding portions 221 of the stator 22 are interlocked with the recesses 211 of the stator casing 21, so that the stator 22 is unable to rotate relative to the stator casing 21 after the stator 22 is embedded into the stator casing 21. Each of the protruding portions 221 of the stator 22 has a through hole 222, and each of the through hole 222 extends in a direction parallel to the axis of the output shaft 23.

The axis of the stator casing 21 passes through a center of the output shaft 23. In other words, the axis of the stator casing 21, the axis of the stator 22, and the axis of the output shaft 23 are aligned. The rotor 24 is engaged with a portion of the output shaft 23 where is surrounded by the stator 22, wherein the rotor 24 is spaced from the stator 22. The annular plate 25 is a ring-shaped body, wherein the annular plate 25 abuts against an end surface of the stator casing 21 and an end surface of the stator 22, and the annular plate 25 has a plurality of screw holes 251. The rear end cap 26 has a plurality of perforations and abuts against another end surface of the stator casing 21 and another end surface of the stator 22, wherein the another end surface of the stator casing 21 is opposite to the end surface of the stator 22, and another end surface of the stator 22 is opposite to the end surface of the stator 22. Each of the perforations 261 on the rear end cap 26 is inserted by a screw 27. Each of the screws 27 passes through one of the through hole 222 and is screwed into corresponding one of the screw holes 251 on the annular plate 25. The stator 22 is clamped between the annular plate 25 and the rear end cap 26 to fix in the stator casing 21. A rear bearing 262 is embedded in the middle of the rear end cap 26, wherein the rear bearing 262 surrounds the output shaft 23. A rear end of the output shaft 23 passes through the rear bearing 262 on the rear end cap 26.

The motor fixing frame 30 is engaged with the end surface 14 of the housing 10 by screwing to seal the mounting space 12. The motor fixing frame 30 has a front bearing 32 at the middle of the motor fixing frame 30, wherein the front bearing 32 surrounds the output shaft 23. A front end of the output shaft 23 passes through the front bearing 32 and extends away from the motor fixing frame 30. The motor fixing frame 30 is spaced from the motor 20. More specifically, the motor fixing frame 30 and the motor 20 do not physically contact each other.

When the motor assembly 100 of the current embodiment is mounted in an impact device, the output shaft 23 connected to a working tool of the impact device is affected by the reaction force to vibrate during work. Since the motor fixing frame 30 is spaced from the motor 20, the vibration of the output shaft 23 is transmitted through the front bearing 32 and the motor fixing frame 30 to the housing 10 and is absorbed by the housing 10, thereby avoiding a shearing force to transmit to the screws 27 to break the screws 27. Thus, even though the output shaft 23 of the motor 20 vibrates during an operation for a long time, the motor 20 is not easy to be broken or damaged.

Additionally, during a process of assembling the motor assembly 100, the annular plate 25 abuts against a front side of the stator 22 and a front side of the stator casing 21, and then each of the screws 27 is inserted through one of the perforations 261 of the rear end cap 26 and corresponding one of the through holes 222 of the stator 22 to screw into corresponding one of the screw holes 251 of the annular plate 25, thereby securing the stator 22 in the stator casing 21 to obtain the motor 20. After that, mount the motor 20 to the mounting space 12 of the housing 10, and then engage the motor fixing frame 30 with the end surface 14 of the housing 10 to complete the process of assembling the motor assembly 100. With such design, the motor assembly 100 is easy for assembly or disassembly.

As illustrated in FIG. 2, FIG. 3, FIG. 9, and FIG. 10, the housing 10 has a plurality of grooves 11 on an inner surface of the housing 10. In the current embodiment, the housing 10 has two grooves 11. One of the two grooves 11 is located in the middle of an inner surface of the first shell 16, and the other one of the two grooves 11 is located in the middle of an inner surface of the second shell 18. An outer surface of the stator casing 21 has a plurality of blocks 212, wherein a number of the plurality of blocks 212 is equal to a number of the plurality of grooves 11 on the housing 10, and a location of the blocks 212 corresponds to a location of the grooves 11. When the blocks 212 are inserted into the grooves 11, the stator casing 21 is fixed in the housing 10 and is restricted from rotating and moving in an axial direction. With such design, the vibration is prevented from transmitting in a direction from the housing 10 to the motor 20. To control an operation of the motor assembly 100, a hall sensor circuit board 40 is fixed at a rear end of the stator 22 and is located in the rear end cap 26, wherein the hall sensor circuit board 40 is electrically connected to the stator 22 to control a rotational speed of the rotors 24 and the output shaft 23.

Figure 1:
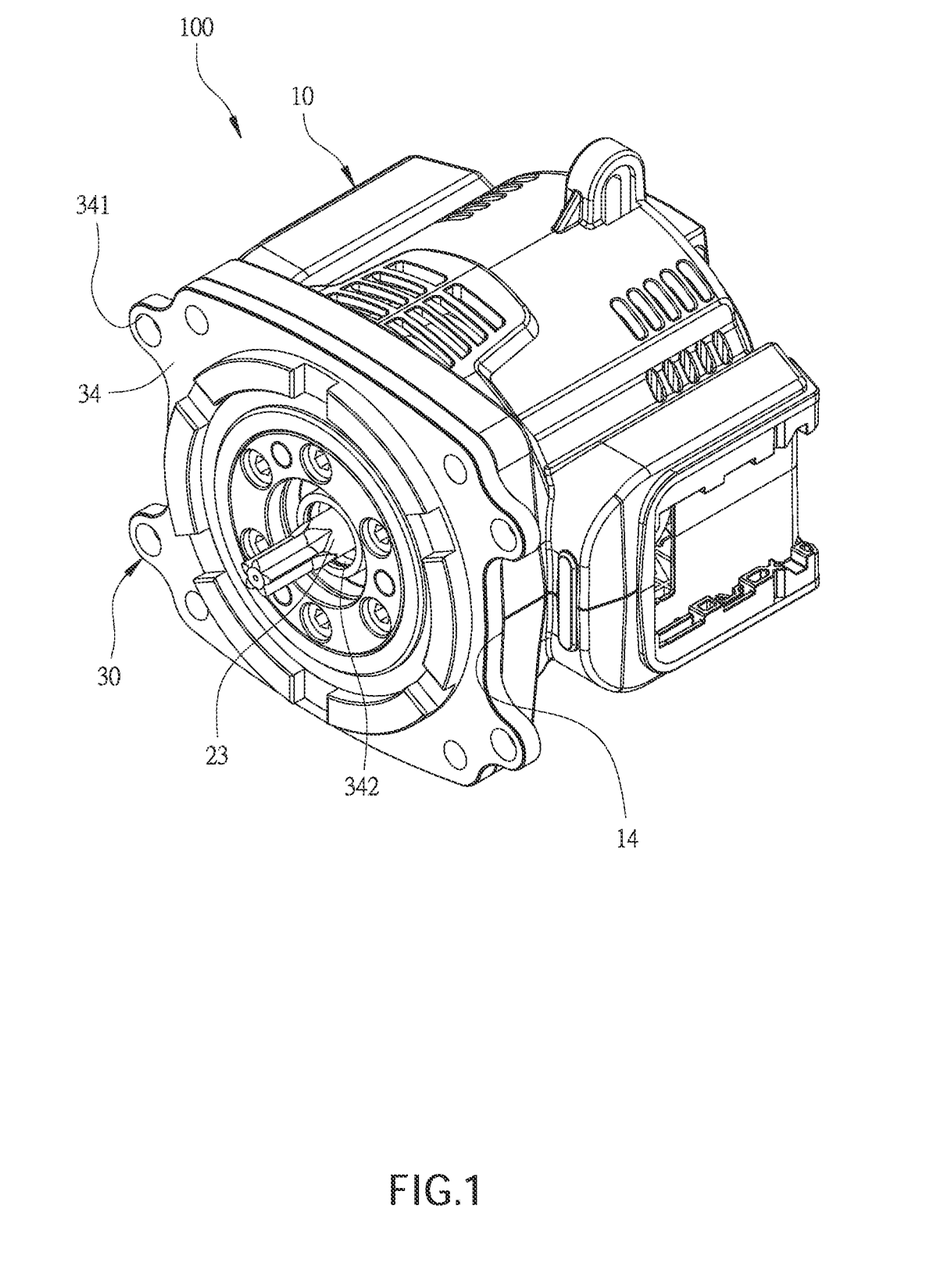
FIG. 1 is a perspective view of the motor assembly of an embodiment according to the present invention.
Figure 2:
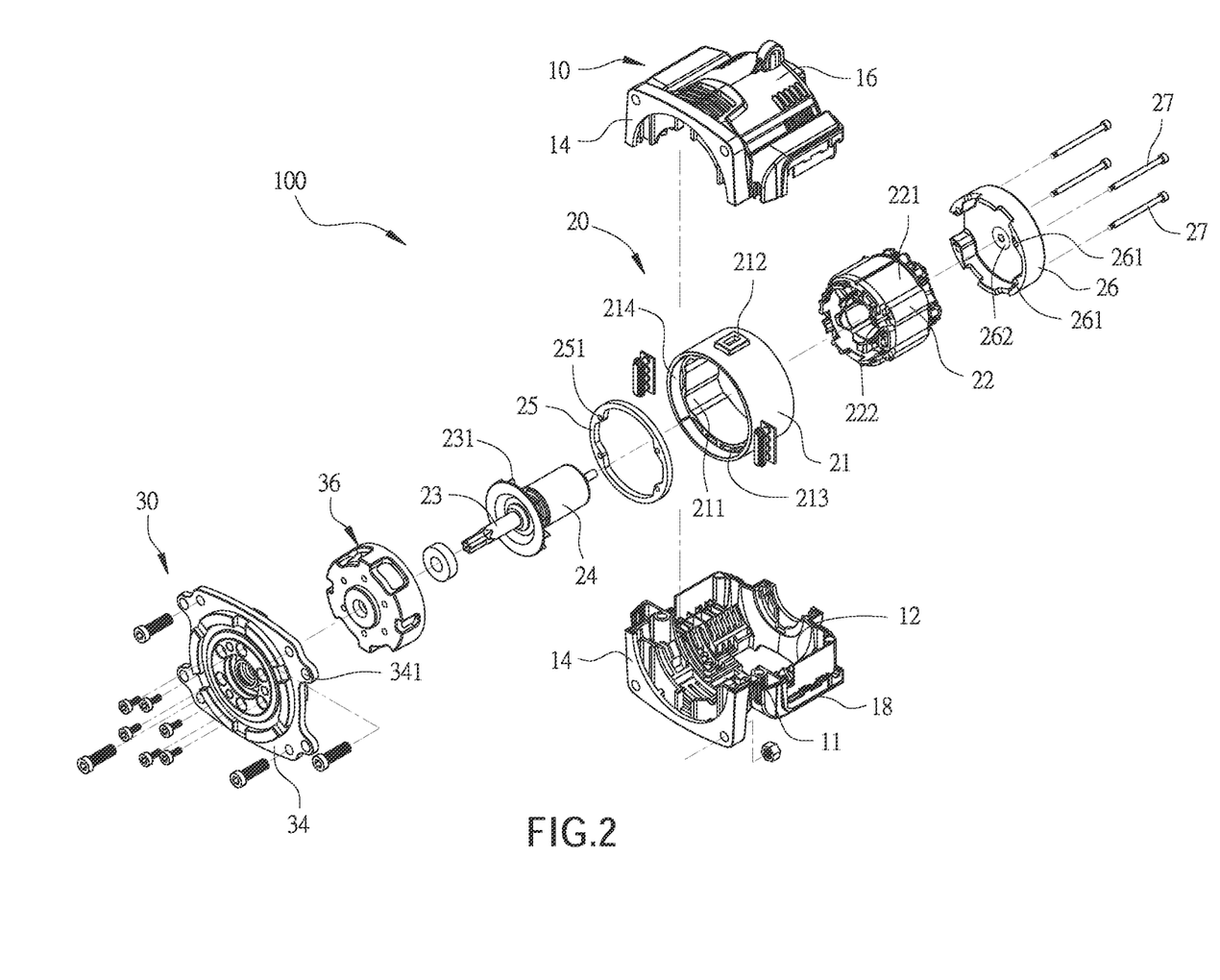
FIG. 2 is an exploded view of the motor assembly of the embodiment according to the present invention.
Figure 3:
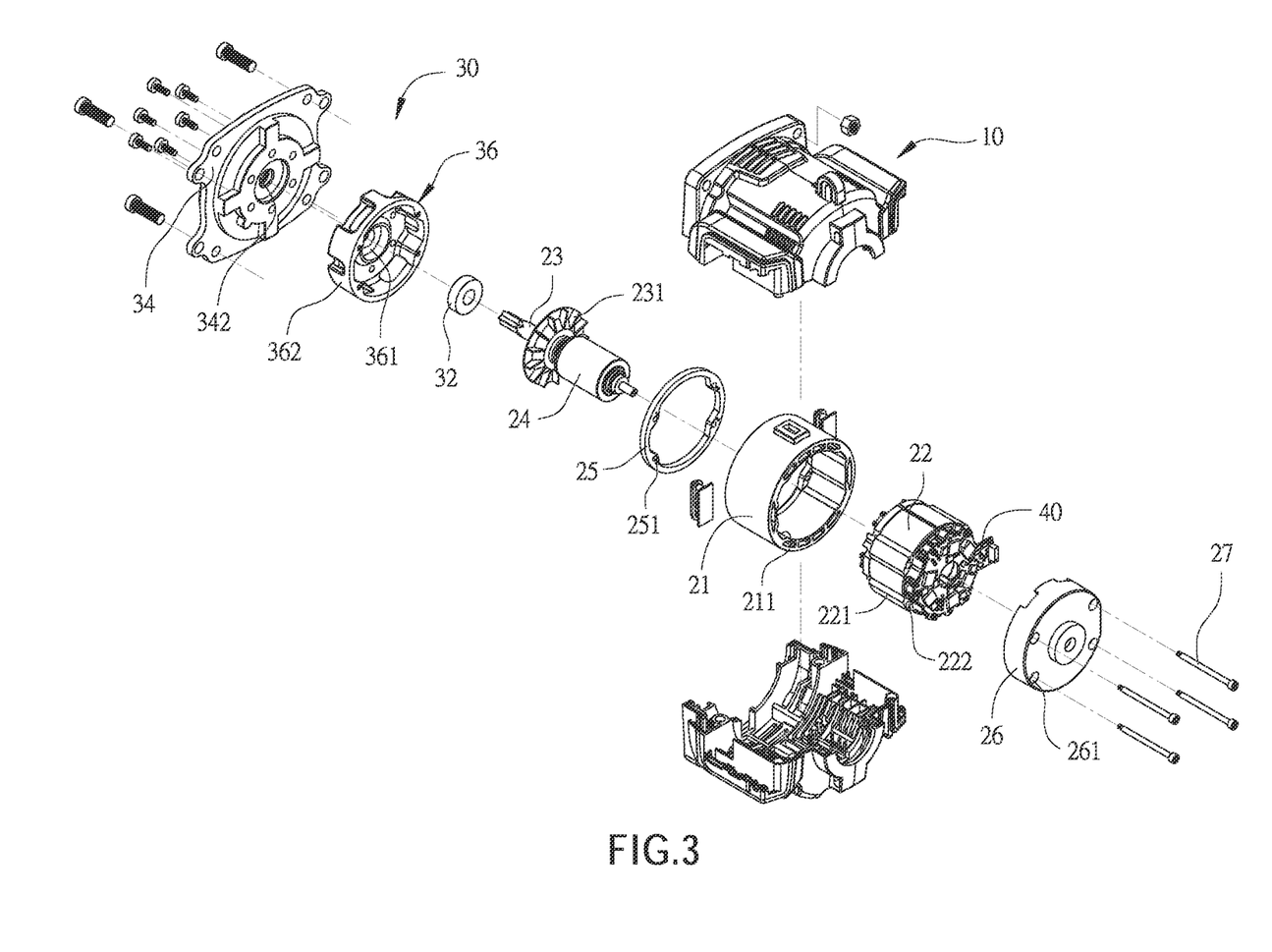
FIG. 3 is an exploded view of the motor assembly of the embodiment according to the present invention seen from another perspective.
Figure 4:
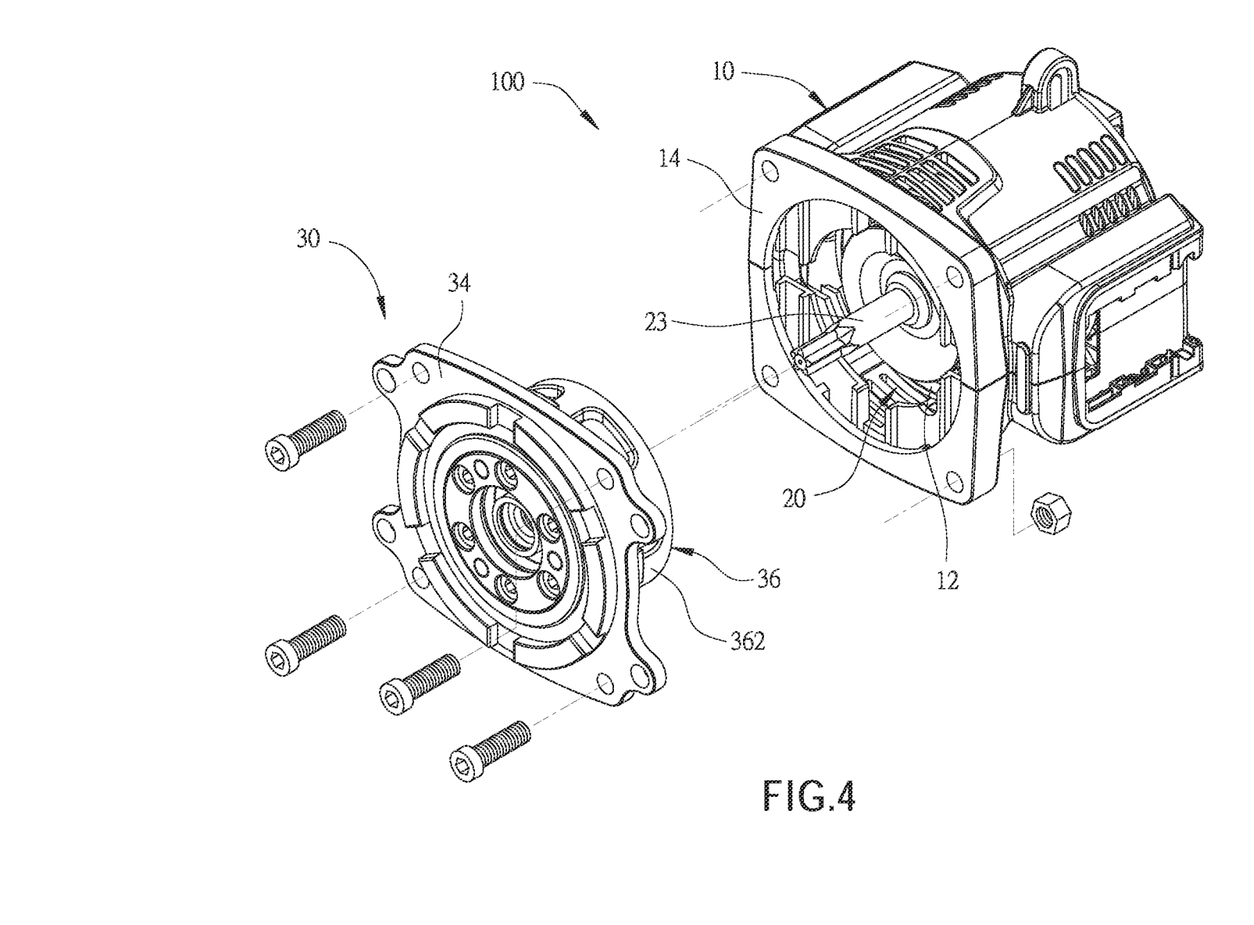
FIG. 4 is an exploded view of the motor assembly, showing the motor fixing frame is departed.
Figure 5:
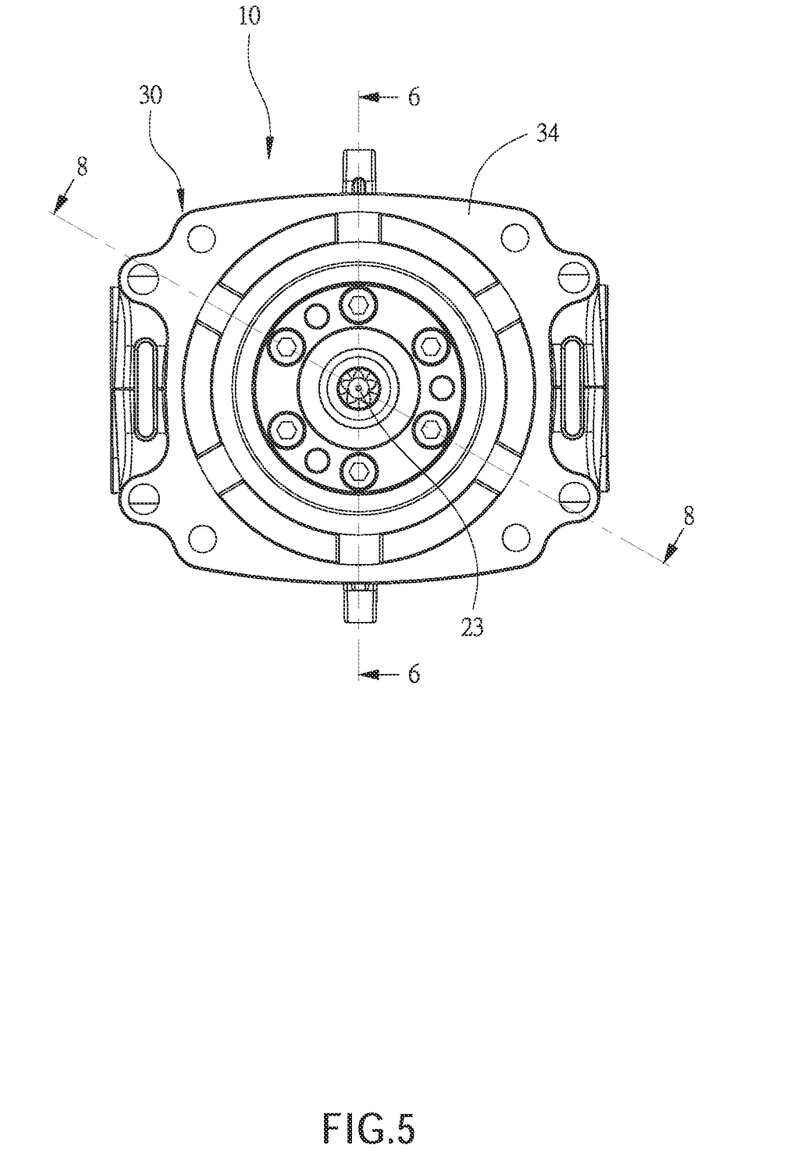
FIG. 5 is a front view of the motor assembly of the embodiment according to the present invention.

As illustrated in FIG. 2 to FIG. 4, an inner side of the end surface of the stator casing 21 is recessed to form a step portion 213 and an extending portion 214, wherein the step portion 213 is annular and runs along the inner circumference of the stator casing 21, the extending portion 214 is annular and is located at an outer side of the step portion 213. An axis of the extending portion 214 is concentric with an axis of the step portion 213. A thickness of the annular plate 25 is smaller than a distance between the end surface of the stator casing 21 and the step portion 213. A side of the annular plate 25 abuts against the step portion 213 to position.

Figure 6:
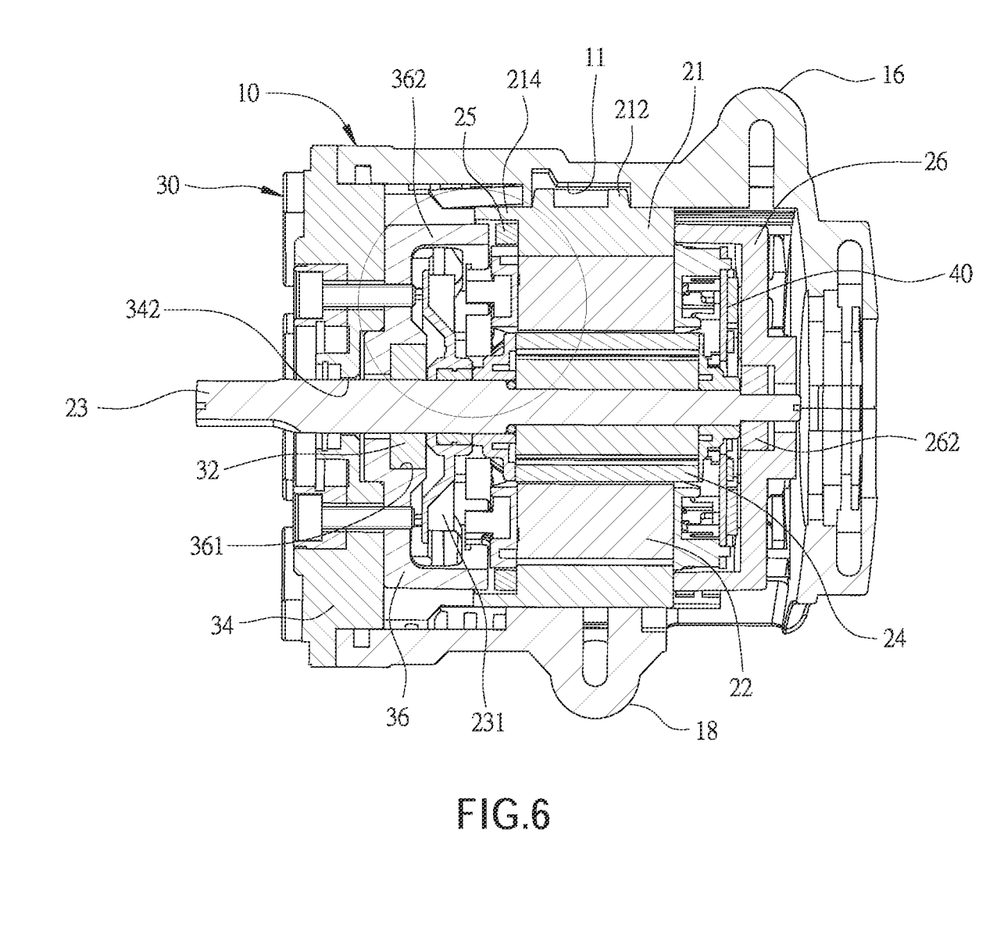
FIG. 6 is a sectional view taken along the 6-6 line in FIG. 5.
Figure 7:
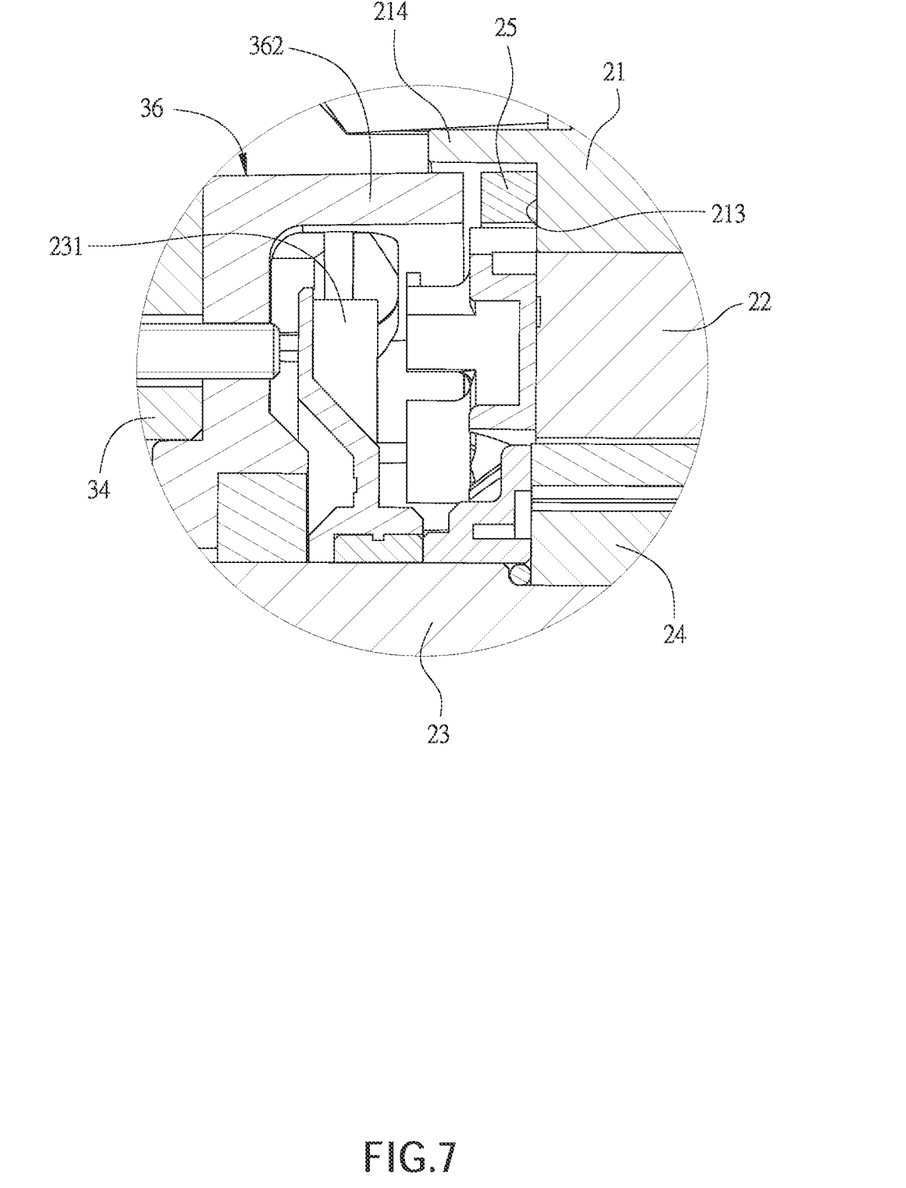
FIG. 7 is an enlarged partial view of a marked region in FIG. 6.
Figure 8:
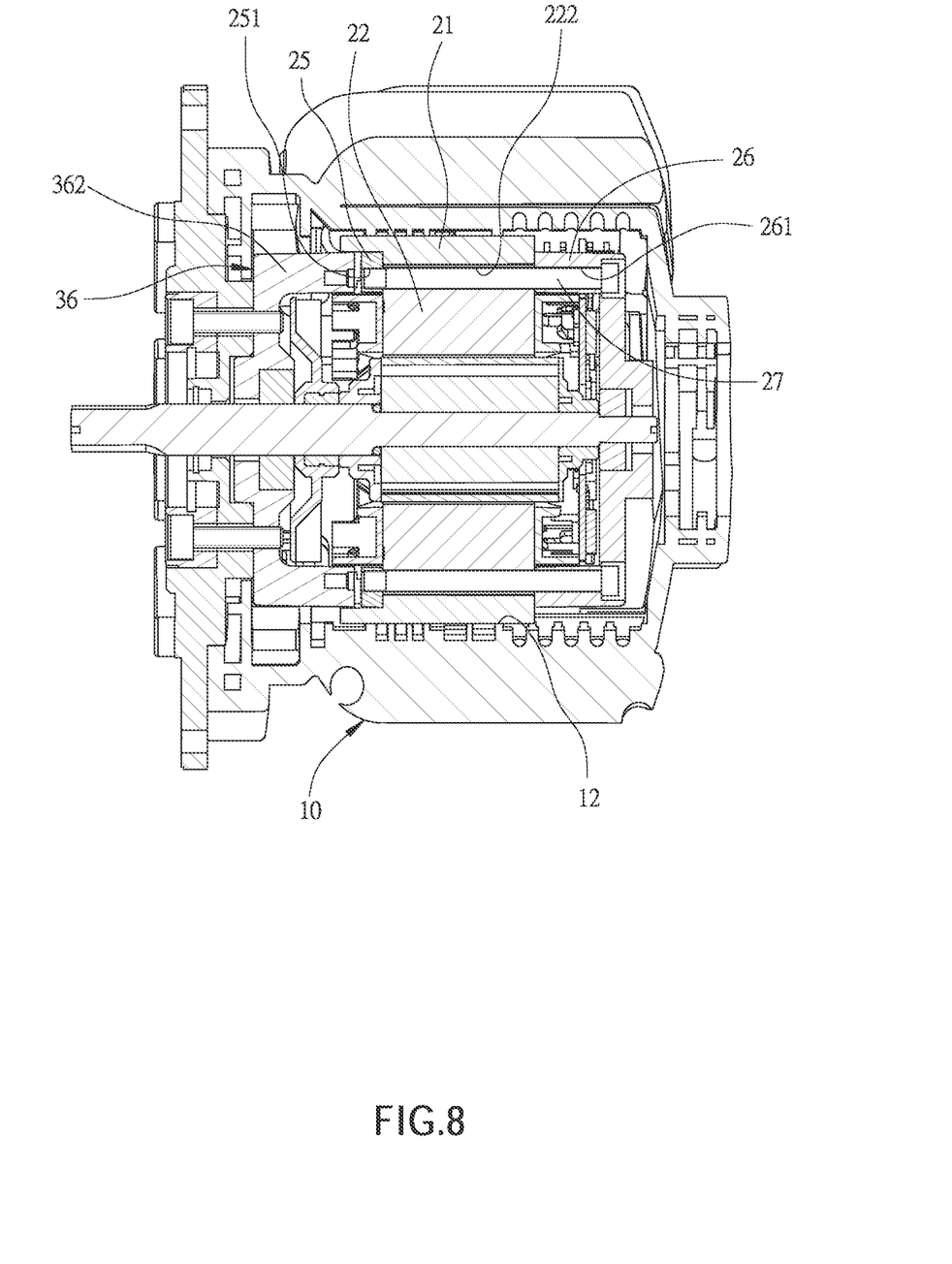
FIG. 8 is a sectional view taken along the 8-8 line in FIG. 5.
Figure 9:
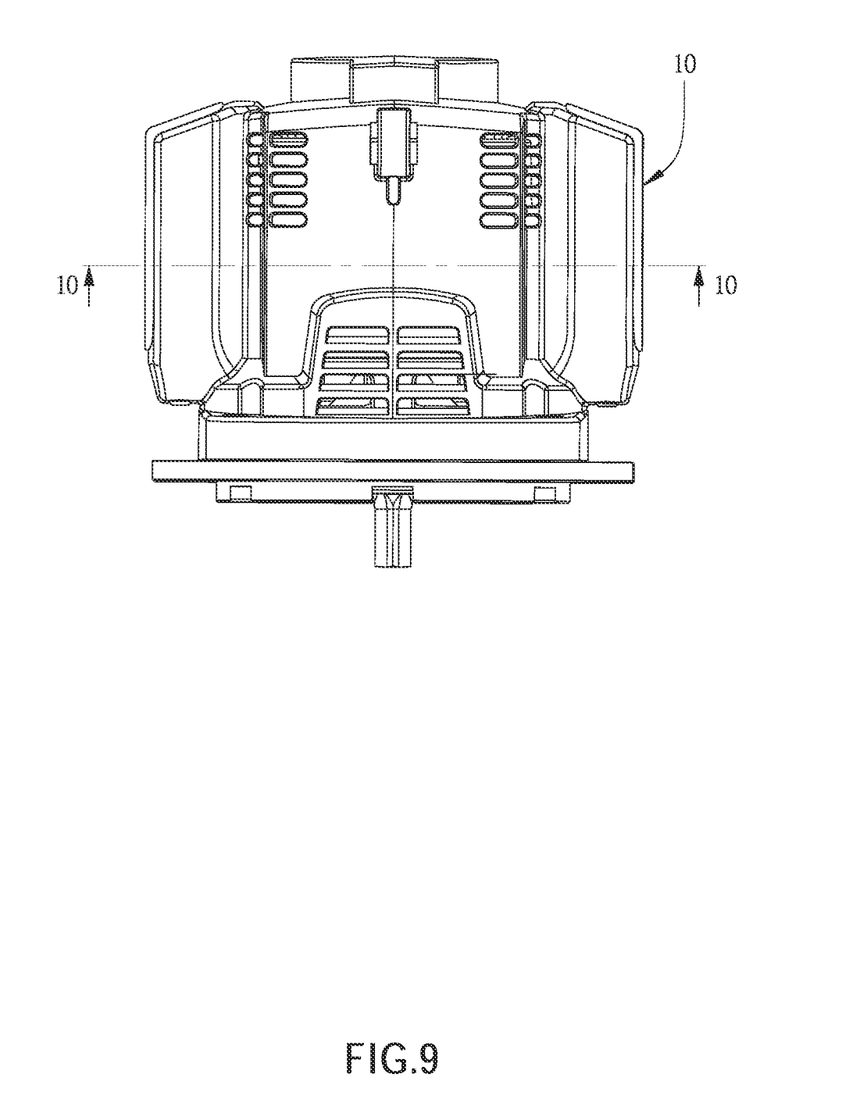
FIG. 9 is a top view of the motor assembly of the embodiment according to the present invention.
Figure 10:
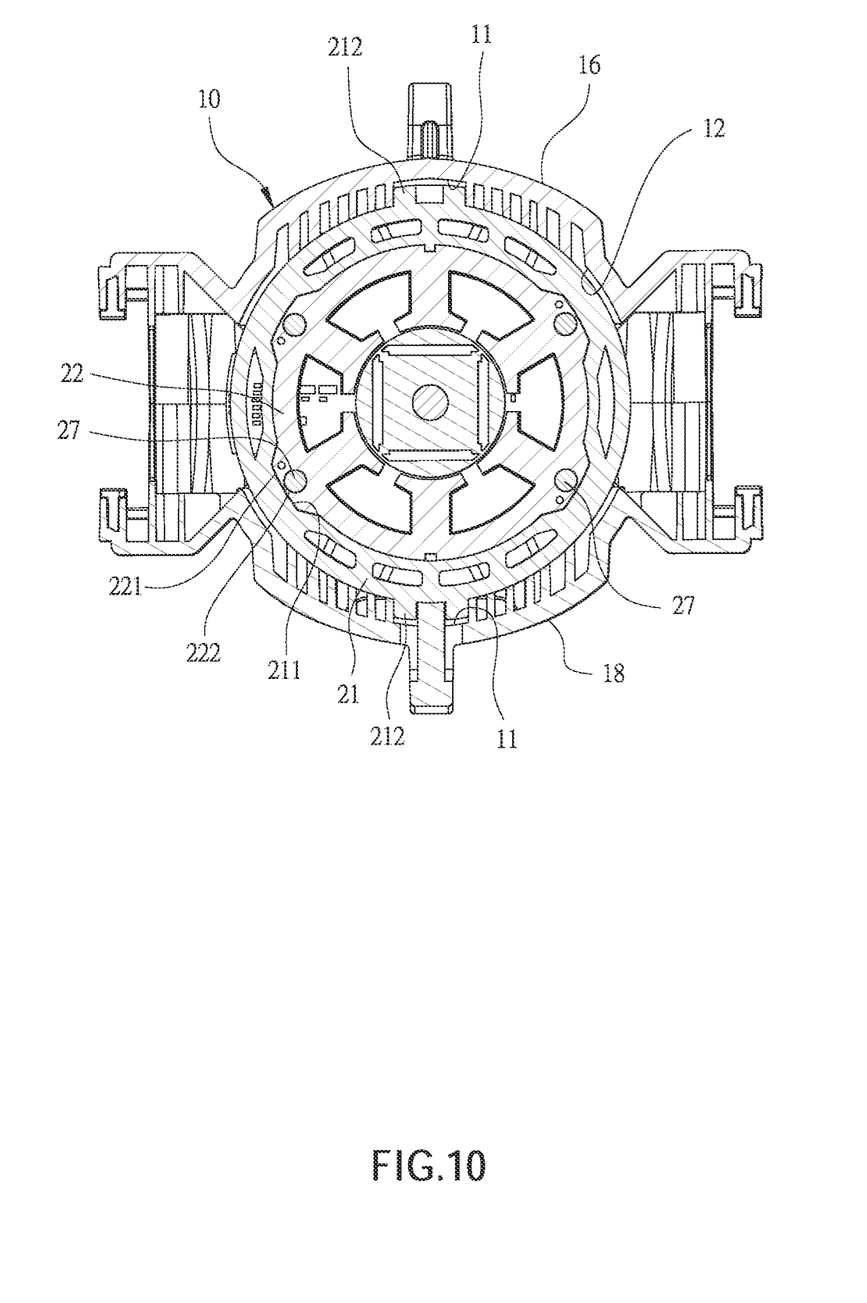
FIG. 10 is a sectional view taken along the 10-10 line in FIG. 9.

The motor fixing frame 30 includes a seating plate 34 and a front end cap 36, wherein the seating plate 34 is engaged with the end surface 14 of the housing 10 by screwing. The seating plate 34 has a plurality of fastening holes 341 located at an edge portion of the seating plate 34. In the current embodiment, each of four corners of the seating plate 34 has one fastening hole 341, and the seating plate 34 has a perforation 342 at a middle of the seating plate 34. The front end of the output shaft 23 passes through the perforation 342 of the seating plate 34. The front end cap 36 is engaged with an inner side of the seating plate 34, wherein the front end cap 36 is annular, and an axis of the front end cap 36 is aligned with an axis of the perforation 342 of the seating plate 34. The front end cap 36 has a bearing seat 361 at the middle of the front end cap 36. The front end cap 36 has a side wall 362 extending in a direction away from the seating plate 34. As illustrated in FIG. 6 to FIG. 8, the side wall 362 is annular and extends in a direction from the seating plate 34 to the motor 20. When a distal end of the side wall 362 is inserted into the step portion 213, the side wall 362 is located between the seating plate 34 and the annular plate 25, and the distal end of the side wall 362 does not touch the annular plate 25. A part of the side wall 362 on the motor fixing frame 30 extends into a space surrounded by the extending portion 214, thereby preventing the dust from entering through a gap between the side wall 362 and the extending portion 214 into the stator casing 21. In the current embodiment, a fan 231 fits around a portion of the output shaft 23 where is surrounded by the side wall 362. As the output shaft 23 is rotated, the fan 231 is driven by the output shaft 23 to rotate and to generate airflow, thereby facilitating heat dissipation of the motor 20.

It must be pointed out that the embodiment described above is only a preferred embodiment of the present invention. All equivalent structures which employ the concepts disclosed in this specification and the appended claims should fall within the scope of the present invention.

What is claimed is:

1. A motor assembly, comprising:
   a housing;
   a motor comprising a stator casing, a stator, an output shaft, a rotor, an annular plate, and a rear end cap; the stator casing is fixed in the housing and is restricted from rotating along an output shaft, the stator is embedded into the stator casing; a circumference of the stator has a plurality of through holes; the output shaft passes through a middle of the stator casing; the rotor is engaged with a portion of the output shaft where is surrounded by the stator; the annular plate abuts against an end surface of the stator casing and an end surface of the stator, and the annular plate has a plurality of screw holes; the rear end cap has a plurality of perforations and abuts against another end surface of the stator casing and another end surface of the stator; each of the perforations on the rear end cap is inserted by a screw, and each of the screws passes through one of the through holes and is screwed into corresponding one of the screw holes on the annular plate; the rear end cap is disposed with a rear bearing, and the output shaft passes through the rear bearing; and
   a motor fixing frame engaged with the end surface of the housing and having a front bearing, wherein the output shaft passes through the front bearing, and the motor fixing frame is spaced from the motor.

2. The motor assembly as claimed in claim 1, wherein the stator casing is fixed in the housing and is restricted from moving in an axial direction.

3. The motor assembly as claimed in claim 2, wherein the motor fixing frame comprises a seating plate and a front end cap; the seating plate is engaged with the end surface of the housing by screwing and has a plurality of fastening holes located at an edge portion of the seating plate; the seating plate has a perforation at a middle of the seating plate, and a front end of the output shaft passes through the perforation of the seating plate.

4. The motor assembly as claimed in claim 3, wherein an inner side of the end surface of the stator casing is recessed to form a step portion and an extending portion; the step portion is annular, and the extending portion is annular and is located at an outer side of the step portion; the annular plate abuts against an inner circumference of the extending portion to position.

5. The motor assembly as claimed in claim 4, wherein the front end cap has a side wall extending in a direction away from the seating plate; a distal end of the side wall is inserted into the step portion, so that the side wall is located between the seating plate and the annular plate and is spaced away from the annular plate; when the motor fixing frame is engaged with the motor, the side wall is located in a space surrounded by the extending portion.

6. The motor assembly as claimed in claim 3, wherein an inner surface of the housing has a plurality of grooves, and an outer surface of the stator casing has a plurality of blocks; each of the plurality of blocks is engaged with one of the plurality of grooves to fix and restrict the stator casing in the housing.

7. The motor assembly as claimed in claim 6, wherein the housing comprises a first shell and a second shell, which are coupled with each other; the inner surface of the housing has two grooves; one of the two grooves is located on an inner surface of the first shell, and the other one of the two grooves is located on an inner surface of the second shell; the outer surface of the stator casing has two blocks that are located at a position corresponding to the two grooves; each of the two blocks is interlocked with one of the two grooves.

8. The motor assembly as claimed in claim 2, wherein an inner surface of the housing has a plurality of grooves, and an outer surface of the stator casing has a plurality of blocks; each of the plurality of blocks is engaged with one of the plurality of grooves to fix and restrict the stator casing in the housing.

9. The motor assembly as claimed in claim 8, wherein the housing comprises a first shell and a second shell, which are coupled with each other; the inner surface of the housing has two grooves; one of the two grooves is located on an inner surface of the first shell, and the other one of the two grooves is located on an inner surface of the second shell; the outer surface of the stator casing has two blocks that are located at a position corresponding to the two grooves; each of the two blocks is interlocked with one of the two grooves.

10. The motor assembly as claimed in claim 2, wherein a hall sensor circuit board is fixed at an end of the stator that is opposite to the motor fixing frame; the hall sensor circuit board is located in the rear end cap and is electrically connected to the stator to control a rotational speed of the rotors and the output shaft.

11. The motor assembly as claimed in claim 1, wherein the motor fixing frame comprises a seating plate and a front end cap; the seating plate is engaged with the end surface of the housing by screwing and has a plurality of fastening holes located at an edge portion of the seating plate; the seating plate has a perforation at a middle of the seating plate, and a front end of the output shaft passes through the perforations of the seating plate.

12. The motor assembly as claimed in claim 11, wherein an inner side of the end surface of the stator casing is recessed to form a step portion and an extending portion; the step portion is annular, and the extending portion is annular and is located at an outer side of the step portion; the annular plate abuts against an inner circumference of the extending portion to position.

13. The motor assembly as claimed in claim 11, wherein an inner surface of the housing has a plurality of grooves, and an outer surface of the stator casing has a plurality of blocks; each of the plurality of blocks is engaged with one of the plurality of grooves to fix and restrict the stator casing in the housing.

14. The motor assembly as claimed in claim 13, wherein the housing comprises a first shell and a second shell, which are coupled with each other; the inner surface of the housing has two grooves; one of the two grooves is located on an inner surface of the first shell, and the other one of the two grooves is located on an inner surface of the second shell; the outer surface of the stator casing has two blocks that are located at a position corresponding to the two grooves; each of the two blocks is interlocked with one of the two grooves.

15. The motor assembly as claimed in claim 1, wherein an inner surface of the housing has a plurality of grooves, and an outer surface of the stator casing has a plurality of blocks; each of the plurality of blocks is engaged with one of the plurality of grooves to fix and restrict the stator casing in the housing.

16. The motor assembly as claimed in claim 15, wherein the housing comprises a first shell and a second shell, which are coupled with each other; the inner surface of the housing has two grooves; one of the two grooves is located on an inner surface of the first shell, and the other one of the two grooves is located on an inner surface of the second shell; the outer surface of the stator casing has two blocks that are located at a position corresponding to the two grooves; each of the two blocks is interlocked with one of the two grooves.

17. The motor assembly as claimed in claim 1, wherein a hall sensor circuit board is fixed at an end of the stator that is opposite to the motor fixing frame; the hall sensor circuit board is located in the rear end cap and is electrically connected to the stator to control a rotational speed of the rotors and the output shaft.

* * * * *